United States Patent
Lee

(10) Patent No.: US 7,035,704 B2
(45) Date of Patent: Apr. 25, 2006

(54) CAPACITY MANAGEMENT SYSTEM AND METHOD

(75) Inventor: Kun-Feng Lee, Hsinchu (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 0 days.

(21) Appl. No.: 10/988,527

(22) Filed: Nov. 16, 2004

(65) Prior Publication Data

US 2006/0004473 A1 Jan. 5, 2006

(30) Foreign Application Priority Data

Jun. 30, 2004 (TW) ................. 93119466 A

(51) Int. Cl.
*G06F 19/00* (2006.01)
*G06Q 30/00* (2006.01)
*G06Q 20/00* (2006.01)

(52) U.S. Cl. ............... 700/99; 700/100; 700/121; 705/22; 705/28

(58) Field of Classification Search ............ 705/8, 705/22, 28; 700/95, 99, 100, 106, 107, 121
See application file for complete search history.

(56) References Cited

U.S. PATENT DOCUMENTS

| 4,646,238 | A  | * | 2/1987 | Carlson et al. ........... 705/28 |
| 6,253,187 | B1 | * | 6/2001 | Fox ............................ 705/28 |
| 2003/0149608 | A1 | * | 8/2003 | Kall et al. .................. 700/99 |

FOREIGN PATENT DOCUMENTS

| TW | 422954 | 2/2001 |
| TW | 497141 | 8/2002 |
| TW | 526529 | 4/2003 |
| TW | 573270 | 1/2004 |

\* cited by examiner

*Primary Examiner*—Leo Picard
*Assistant Examiner*—Charles Kasenge
(74) *Attorney, Agent, or Firm*—Birch,Stewart,Kolasch & Birch,LLP

(57) ABSTRACT

A capacity management system and method. A demand priority for each foundry and commodity capacity demand is determined according to sales and product information thereof. A capacity is then allocated for the foundry and commodity capacity demands according to the corresponding demand priority, thereby generating a capacity allocation plan. Then, an output request plan is generated according to the capacity allocation plan, a product cycle time, product order status and product inventory status. The product inventory status comprises information of products in process and finished goods.

20 Claims, 6 Drawing Sheets

CAPACITY MANAGEMENT SYSTEM AND METHOD

BACKGROUND

The present disclosure relates generally to capacity management, and, more particularly, to systems and methods that allocate capacity and generate output request plans for foundry and commodity capacity demands.

In product supply, a supply chain supports material purchase, fabrication of materials into intermediate and finished products, and distribution of finished products to clients. In the supply chain, clients transmit demands to a supplier. The supplier forecasts and plans its internal or external manufacturing schedule according to these received demands, and allocates capacity for product manufacture to satisfy each client. Supply chain management has become important in meeting goals of reduced inventory, increased productivity, and enhanced competitiveness.

There are various business models in the semiconductor industry. For example, semiconductor companies can be classified into fabless businesses, such as IC design houses, pure IC foundries, and manufacturers with both foundry and commodity products, such as specialized memory companies. For all the business models, effective capacity management in supply chain management, without excess capacity loss, has become important for product suppliers requiring control of manufacture or distribution.

For manufacturers with both foundry and commodity products, the foundry and commodity products have different properties. For example, timeliness is not important for the commodity products. The commodity products can be fabricated and stocked in advance. The foundry products, however, must be fabricated and delivered before a committed date promised to clients. Consequently, the capacity allocation between the foundry and commodity products directly impacts the achievement of supply chain management.

FIGS. 1A and 1B are schematic diagrams respectively illustrating the capacity allocations for foundry and commodity products when foundry product demands increase and decrease. Manufacturing and distribution facilities have a limited capacity 100. If the foundry product demands an increase, part of the capacity originally allocated for commodity products 110 may be reallocated for foundry products 120, as shown in FIG. 1A. If the foundry product demands a decrease, the unused capacity can be allocated for commodity products 110, for fully utilizing the capacity 100, as shown in FIG. 1B.

Currently, since the above adjustment mechanism is based on experience, and there is no systematic and automatic mechanism for capacity allocation between foundry and commodity products, the capacity may not be fully and efficiently utilized. Additionally, clients cannot know the manufacturing and output schedules for their products, thereby lowering the service quality of product suppliers. Further, the foundry and commodity products are always planned separately. The foundry and commodity products, however, are the same product type, and are not differentiated in a production line. An output request plan comprising foundry and commodity products will make the manufacturing plan complete, and part of the WIP (work in process) or inventory products can be provided for commodity products to advance the scheduled time of foundry product demands. Since there is no efficient mechanism for capacity management between foundry and commodity products, the plan for actual output request cannot follow.

SUMMARY

An embodiment of the invention is described from the semiconductor industry perspective, the invention, however, is applicable to any factory, service supplier, and/or product.

An embodiment of the invention provides a capacity management system. The system includes a database, product inventory status, and a planning engine. The database stores foundry capacity demands from clients and commodity capacity demands. The planning engine determines a demand priority for each foundry and commodity capacity demand according to sales and product information thereof, and allocates a capacity for each foundry and commodity capacity demand according to the corresponding demand priority and a request date, thereby generating a capacity allocation plan.

The planning engine further determines a wafer-start date for each foundry and commodity capacity demand according to the capacity allocation plan.

The planning engine further generates an output request plan according to the capacity allocation plan, a product cycle time, product order status and product inventory status, and determines an output date for each foundry and commodity capacity demand according to the output request plan. The product inventory status comprises information of products in process and finished goods.

The sales information comprises client grade, required output date, and market demand. The product information comprises product type, manufacturing policy, product margin, and product yield.

A capacity management method is also provided. First, foundry capacity demands from clients and commodity capacity demands are received. A demand priority is then determined for each foundry and commodity capacity demand according to sales and product information thereof. Then, a capacity is allocated for each foundry and commodity capacity demand according to the corresponding demand priority and a request date, thereby generating a capacity allocation plan.

A wafer-start date is further determined for each foundry and commodity capacity demand according to the capacity allocation plan.

An output request plan is further generated according to the capacity allocation plan, a product cycle time, product order status, and product inventory status, and an output date is determined for each foundry and commodity capacity demand according to the output request plan. The product inventory status comprises information of products in process and finished goods.

The sales information comprises client grade, required output date, and market demand. The product information comprises product type, manufacturing policy, product margin, and product yield.

The above-mentioned method may take the form of program code embodied in a tangible media. When the program code is loaded into and executed by a machine, the machine becomes an apparatus for practicing the disclosed method.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only and thus are not limitative of the present invention, and wherein.

DESCRIPTION

Figure 1A:
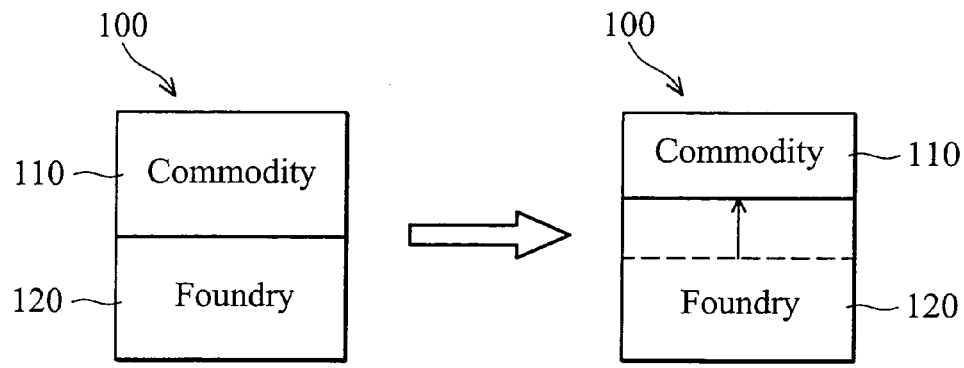
FIG. 1A is a schematic diagram illustrating the capacity allocation for foundry and commodity products when foundry product demands increase.
Figure 1B:
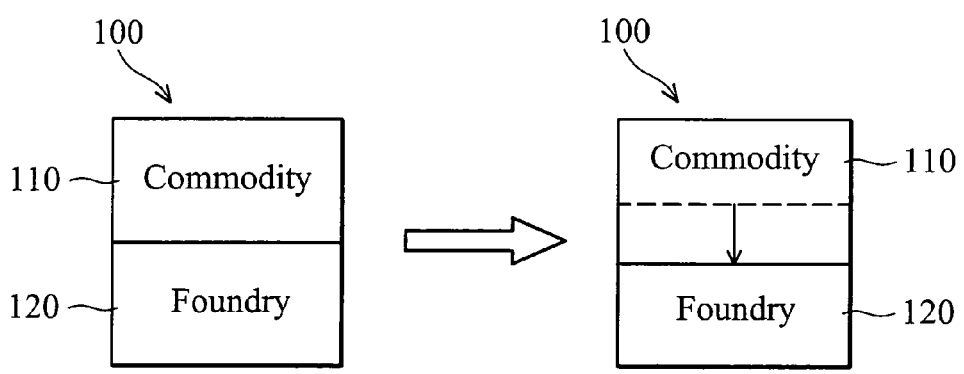
FIG. 1B is a schematic diagram illustrating the capacity allocation for foundry and commodity products when foundry product demands decrease.
Figure 2:
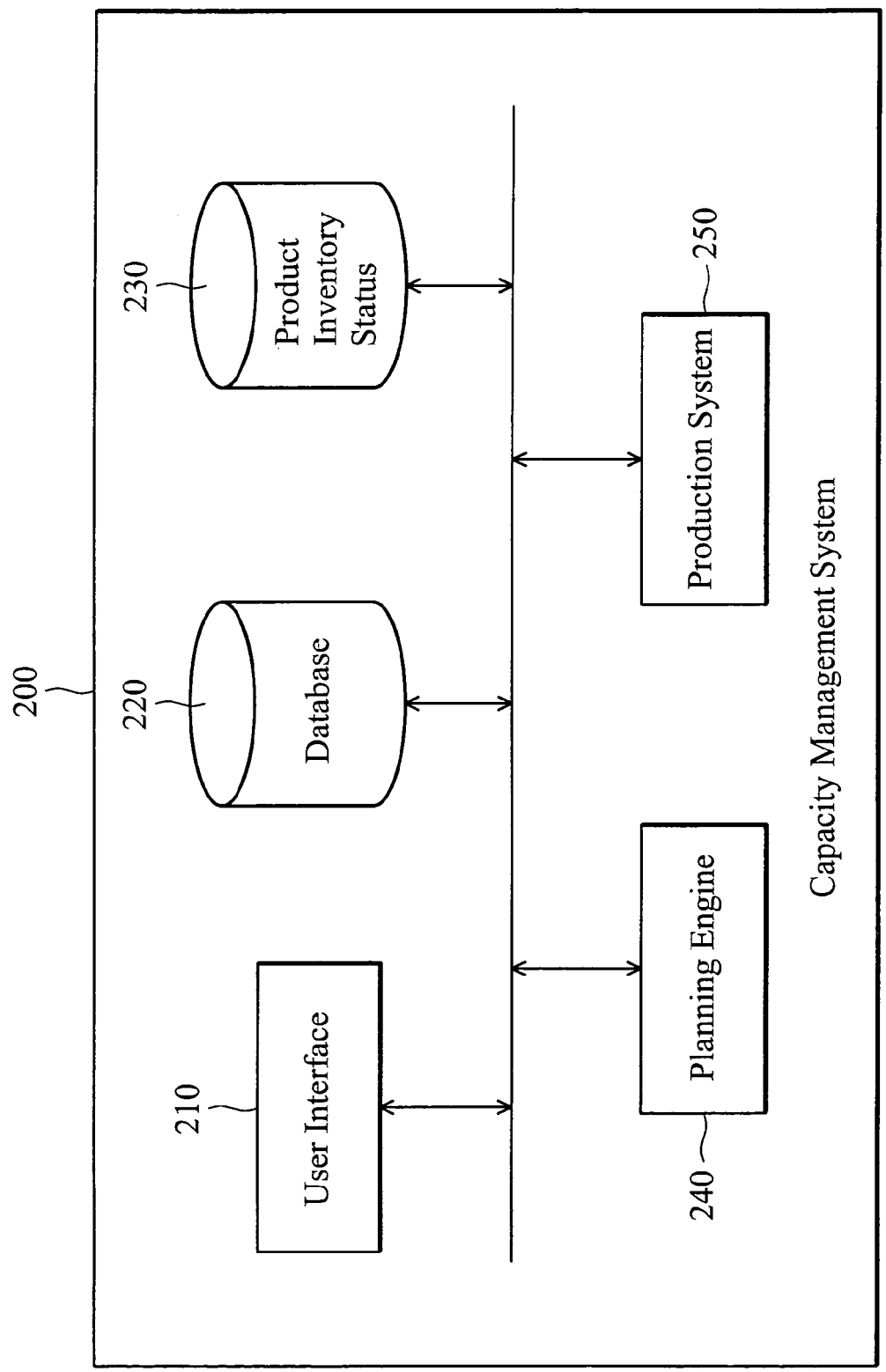
FIG. 2 is a schematic diagram illustrating the architecture of the capacity management system according to embodiments of the invention.

FIG. 2 is a schematic diagram illustrating the architecture of the capacity management system according to an embodiment of the invention. The invention is suitable for use in any factory that manufactures products, such as a semiconductor manufacturer having both commodity products and foundry business, but not limited thereto. The capacity management system 200 includes a user interface 210, a database 220, a product inventory status 230, a planning engine 240, and a production system 250.

The user interface 210 receives foundry capacity demands from clients and commodity capacity demands from in-house personnel. The database 220 stores the capacity demands received by the user interface 210. Each capacity demand comprises corresponding sales and production information. The sales information comprises client grade, required output date, market demand, and others. The product information comprises product type, manufacturing policy, product margin, product yield, and others. It is understood that the capacity management system 200 can be integrated with an ERP (Enterprise Resource Planning) system, and the sales and production information can be received from the ERP system. The product inventory status 230 comprises information of products in process, finished goods, and others.

It is understood that foundry and commodity capacity demands can designate various kinds of product types to be manufactured, and the factory must be capable of manufacturing the designated product types. Additionally, products may be jointly manufactured by the factory and contractors. In the semiconductor industry, for example, products must pass through wafer fabrication, testing, assembly, and other processes. Part of the processes may be performed by the contractors. Therefore, the product inventory status 230 may be received from the contractors via the user interface 210. The planning engine 240 performs the capacity management method of embodiments of the invention, and generates planning results. A detailed description follows. The planning results can be provided to the production system 250 to follow.

Figure 3:
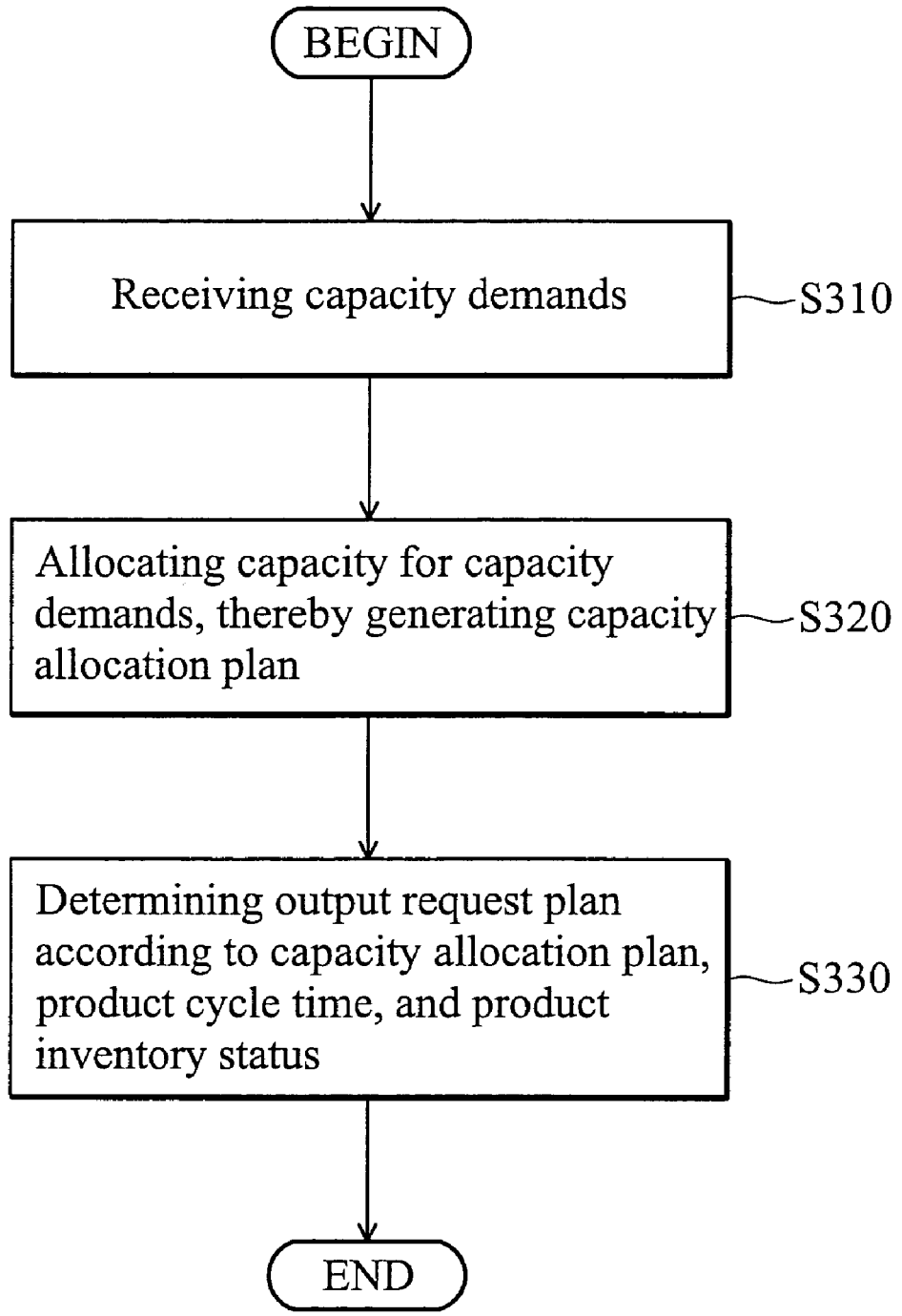
FIG. 3 is a flowchart showing the capacity management method according to a first embodiment of the invention.

FIG. 3 is a flowchart showing the capacity management method according to a first embodiment of the invention. First, in step S310, capacity demands corresponding to a product are received. Then, in step S320, the planning engine 240 allocates a capacity of a factory for each capacity demand, thereby generating a capacity allocation plan. Then, in step S330, the planning engine 240 determines an output request plan according to the capacity allocation plan, a product cycle time, and the product inventory status. The product inventory status comprises information of products in process and finished goods.

It is understood that the capacity demands are not separated into foundry or commodity in the first embodiment. Capacity for each capacity demand can be allocated according to corresponding received date (request date). Since a product requires a product cycle time from wafer-start to finished goods, a time interval comprising at least one product cycle time exists between the capacity required date and output date. The output request plan for a production period comprising the time interval must account for the product inventory status on both the factory and contractor sides.

Figure 4:
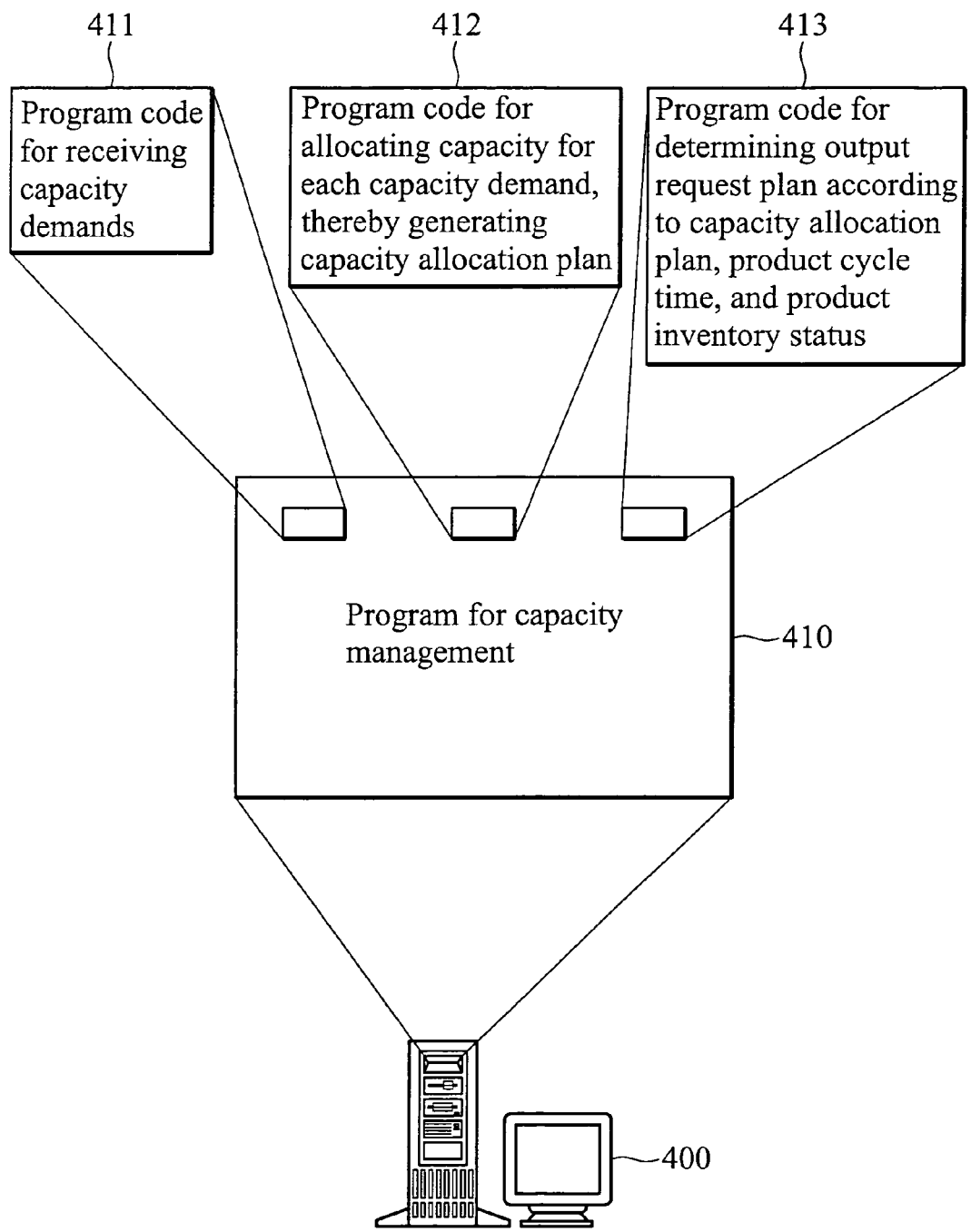
FIG. 4 is a schematic diagram illustrating a storage medium storing a computer program for execution of the capacity management method according to the first embodiment of the invention.

FIG. 4 is a diagram of a storage medium storing a computer program providing a capacity management method according to the first embodiment of the present invention. The computer program product comprises a storage medium 410 storing computer readable program code for use in a computer system 400. The computer readable program code comprises at least computer readable program code 411 receiving capacity demands corresponding to a product, computer readable program code 412 allocating a capacity of a factory for each capacity demand, thereby generating a capacity allocation plan, and computer readable program code 413 determining an output request plan according to the capacity allocation plan, a product cycle time, and product inventory status.

Figure 5:
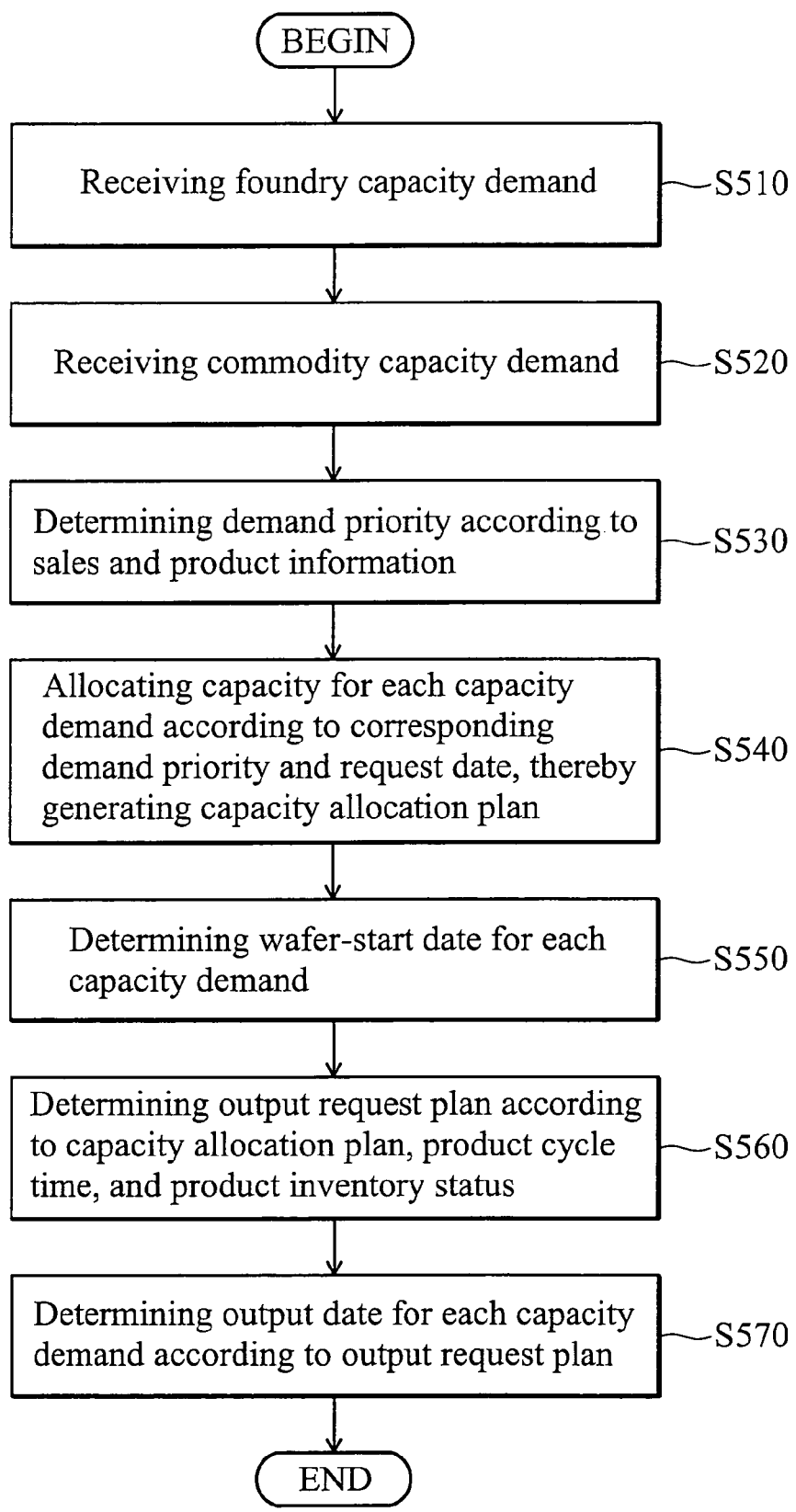
FIG. 5 is a flowchart showing the capacity management method according to a second embodiment of the invention.

FIG. 5 is a flowchart showing the capacity management method according to a second embodiment of the invention. First, in steps S510 and S520, foundry capacity demands from clients and commodity capacity demands are received. The foundry and commodity capacity demands have respective sales and product information. Then, in step S530, the planning engine 240 determines a demand priority for each foundry and commodity capacity demand according to corresponding sales and product information thereof according to:

$$ORP = \sum_{i=1}^{n} (RWi \times DVi), \quad (1)$$

wherein ORP is the demand priority, RW is a weight for respective sales and product information, DV is a data value corresponding to respective sales and product information, and n is the number of the sales and product information. The sales information comprises client grade, required output date, and market demand. The product information comprises product type, manufacturing policy, product margin, and product yield. It is understood that the sales and product information, and the corresponding weights can be set and updated via the user interface 210, and the sales and product information can be also configured via the user interface 210.

In step S540, the planning engine 240 allocates a capacity of a factory for each foundry and commodity capacity demand according to the corresponding demand priority and a request date, thereby generating a capacity allocation plan. Then, in step S550, the planning engine 240 determines a wafer-start date for each foundry and commodity capacity demand according to the capacity allocation plan. In step S560, an output request plan is determined according to the capacity allocation plan, a product cycle time, product order status, and the product inventory status, and in step S570, an output date is determined for each foundry and commodity capacity demand according to the output request plan. The product order status comprises the request date of capacity demand, demand type, required output date, and others. The product inventory status comprises information of products in process, finished goods, and others.

In the second embodiment, the capacity demands are separated into foundry and commodity. The data values corresponding to the sales and product information of the commodity capacity demands can be set to be smaller than that of the foundry capacity demands, such that the foundry capacity demands have higher priority. Similarly, the output request plan for a production period comprising the product cycle time interval must account for the product inventory status in both the factory and contractor sides.

Figure 6:
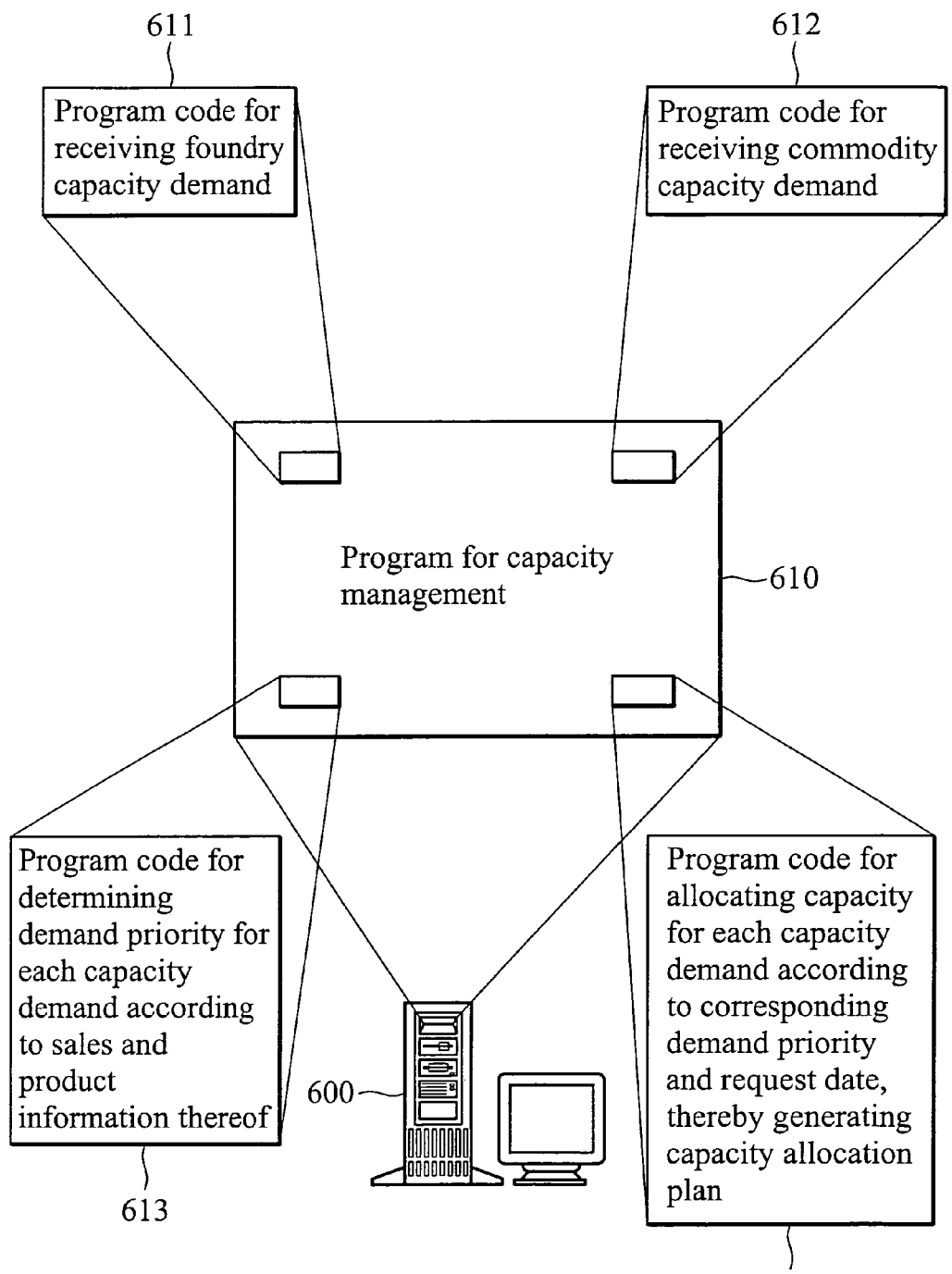
FIG. 6 is a schematic diagram illustrating a storage medium storing a computer program for execution of the capacity management method according to the second embodiment of the invention.

FIG. 6 is a diagram of a storage medium storing a computer program providing a capacity management method according to the second embodiment of the present invention. The computer program product comprises a storage medium 610 storing computer readable program code for use in a computer system 600. The computer readable program code comprises at least computer readable program code 611 receiving foundry capacity demands, computer readable program code 612 receiving commodity capacity demands, computer readable program code 613 determining a demand priority for each foundry and commodity capacity demand according to corresponding sales and product information thereof, and computer readable program code 614 allocating a capacity of a factory for each foundry and commodity capacity demand according to the corresponding demand priority and a request date, thereby generating a capacity allocation plan. The computer readable program code further comprises computer readable program code determining a wafer-start date for each foundry and commodity capacity demand according to the capacity allocation plan, computer readable program code determining an output request plan according to the capacity allocation plan, a product cycle time, product order status, and the product inventory status, and computer readable program code determining an output date for each foundry and commodity capacity demand according to the output request plan.

Embodiments of the invention provide systematic and automatic systems and methods that efficiently allocate capacity between foundry and commodity capacity demands according to corresponding sales and product information. Additionally, embodiments of the invention generate output request plans according to actual and integral product inventory status for such the production line to follow.

Embodiments of the methods and systems, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the embodiment. Embodiments of the method and system may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the embodiments. When implemented on a general-purpose processor, the program code combines with the processor to provide a unique apparatus that operates analogously to application specific logic circuits.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A capacity management method, comprising:
receiving at least one foundry capacity demand, in which the foundry capacity demand requests a factory to manufacture products for a client;
receiving at least one commodity capacity demand, in which the commodity capacity demand requests manufacturing products owned by the factory;
determining a demand priority for each foundry and commodity capacity demand according to sales and product information thereof, and an equation:

$$ORP = \sum_{i=1}^{n}(RWi \times DVi),$$

wherein ORP is the demand priority, RW is a weight for respective sales and product information, DV is a data value corresponding to respective sales and product information, and n is the number of sales and product information; and
allocating a capacity of the factory for the foundry and commodity capacity demands according to the corresponding demand priority and a request date, thereby generating a capacity allocation plan.

2. The method of claim 1 further comprising determining a wafer-start date for each foundry and commodity capacity demand according to the capacity allocation plan.

3. The method of claim 1 further comprising determining an output request plan according to the capacity allocation plan, a product cycle time, product order status, and product inventory status.

4. The method of claim 3 further comprising determining an output date for each foundry and commodity capacity demand according to the output request plan.

5. The method of claim 3 further comprising receiving the product inventory status from at least one contractor.

6. The method of claim 3 wherein the product inventory status comprises information of products in process and finished goods.

7. The method of claim 1 wherein the sales information comprises client grade, required output date, or market demand.

8. The method of claim 1 wherein the product information comprises product type, manufacturing policy, product margin, or product yield.

9. A capacity management system, comprising:
a database storing at least one foundry capacity demand and at least one commodity capacity demand of a factory, in which the foundry capacity demand requests the factory to manufacture products for a client, and the commodity capacity demand requests manufacturing products owned by the factory; and
a planning engine to determine a demand priority for each foundry and commodity capacity demand according to sales and product information thereof, and an equation:

$$ORP = \sum_{i=1}^{n} (RWi \times DVi),$$

wherein ORP is the demand priority, RW is a weight for respective sales and product information, DV is a data value corresponding to respective sales and product information, and n is the number of the sales and product information, and the planning engine allocates a capacity of the factory for the foundry and commodity capacity demands according to the corresponding demand priority and a request date, thereby generating a capacity allocation plan.

10. The system of claim 9 wherein the planning engine further determines a wafer-start date for each foundry and commodity capacity demand according to the capacity allocation plan.

11. The system of claim 9 wherein the planning engine further determines an output request plan according to the capacity allocation plan, a product cycle time, product order status, and product inventory status.

12. The system of claim 11 wherein the planning engine further determines an output date for each foundry and commodity capacity demand according to the output request plan.

13. The system of claim 11 wherein the product inventory status is received from at least one contractor.

14. The system of claim 11 wherein the product inventory status comprises information of products in process and finished goods.

15. The system of claim 9 wherein the sales information comprises client grade, required output date, or market demand.

16. The system of claim 9 wherein the product information comprises product type, manufacturing policy, product margin, or product yield.

17. The system of claim 9 further comprising an interface to receive the foundry capacity demand from the client.

18. The system of claim 9 wherein the sales and product information is received from an ERP (Enterprise Resource Planning) system.

19. A machine-readable storage medium comprising a computer program, which, when executed, causes a computer to perform a capacity management method, the method comprising:
receiving at least one foundry capacity demand, in which the foundry capacity demand requests a factory to manufacture products for a client;
receiving at least one commodity capacity demand, in which the commodity capacity demand requests manufacturing products owned by the factory;
determining a demand priority for each foundry and commodity capacity demand according to sales and product information thereof, and an equation:

$$ORP = \sum_{i=1}^{n} (RWi \times DVi),$$

wherein ORP is the demand priority, RW is a weight for respective sales and product information, DV is a data value corresponding to respective sales and product information, and n is the number of the sales and product information; and
allocating a capacity of the factory for the foundry and commodity capacity demands according to the corresponding demand priority and a request date, thereby generating a capacity allocation plan.

20. The storage medium of claim 19 wherein the method further comprises determining an output request plan according to the capacity allocation plan, a product cycle time, product order status, and product inventory status, wherein the product inventory status comprises information of products in process and finished goods.

* * * * *